Figure 1:
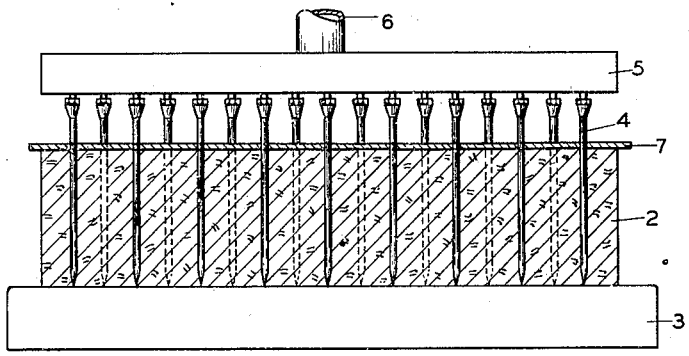

Dec. 13, 1949  B. R. ABBOTT  2,490,766
METHOD OF MAKING CORKBOARD
INSULATION AND THE LIKE
Filed Nov. 12, 1946

INVENTOR.
BOYD R. ABBOTT
by
Walter & Kaufman
ATTORNEY

Patented Dec. 13, 1949

2,490,766

UNITED STATES PATENT OFFICE 2,490,766

METHOD OF MAKING CORKBOARD INSULATION AND THE LIKE

Boyd R. Abbott, Norristown, Pa., assignor to Armstrong Cork Company, Lancaster, Pa., a corporation of Pennsylvania Application November 12, 1946, Serial No. 709,314

13 Claims. (Cl. 18—47.5)

This invention relates to a method of making corkboard insulation and the like from a mass of cork granules which are bound together with the natural resinous material contained in the cork. The invention is applicable to the various manufacturing practices employed in the industry, but is particularly useful in connection with the so-called steam-bake process of manufacturing corkboard. One type of steam-baking process is disclosed in Bertlesen Patent No. 1,607,047, and the present invention is particularly adapted for use in the manufacture of cork insulation board following that general practice. A modified steam-bake method is disclosed in Champney Patent No. 2,066,988, and a further modification is disclosed in Schwarz Patent No. 2,041,377. The invention is also useful with processes in which the cork is baked in a closed mold externally heated, but is more important and more useful where the mass of cork granules is heated by means of superheated steam as disclosed in the patents referred to above.

In the most commonly used process, the cork granules are charged into a preheated mold which is held at a temperature between about 450° F. to 600° F., generally about 550° F. The mold is closed at the bottom with a perforated plate, and a perforated top plate is brought down and compresses the cork granules. Superheated steam is then passed through the mass of cork granules in the mold, the steam being maintained at a temperature in the order of about 450° F. to 600° F. Heating in this manner is effected for a period of about 15 to 20 minutes in the manufacture of a block 37" x 19½" x 13" at a temperature of about 550° F.

One of the problems incident to the steam-bake process of corkboard manufacture is to prevent burning of the blocks upon extraction from the mold and presentation into an atmosphere which will support combustion. The blocks are at a temperature well above the ignition temperature of the cork, having been baked by steam at 550° F., and burning frequently occurs shortly after extraction of the completed blocks.

It has been proposed in Champney Patent No. 2,337,458 to inject saturated steam into a mass of cork granules disposed in a heated mold in order to effect cooling thereof and prevent burning. Such practice is commercially unattractive because the cooling of the cork granules will inevitably result in a corresponding reduction in the mold temperature, necessitating a longer cycle of operation to bring the mold up again to proper molding temperature for the subsequent baking cycle. It has also been suggested to maintain cooling air in contact with the formed blocks, but this is ineffective because the blocks, being relatively open and porous, will burn interiorly due to the presence of oxygen in a large volume at the surface. There is an exothermic reaction which takes place within the block, and it is not unusual in a block baked at 550° F. to reach a temperature of 600° F. within the block, and this is, of course, well above the ignition point of the cork.

According to the present invention, the cork granules are baked in any customary manner, such as the steam-baking treatment of the Bertlesen patent referred to above. The blocks are ejected from the molds and are then fed to a station where water is injected directly within the blocks. This water injection is effected at a multiplicity of spaced points throughout the cross-section of the block and is effective for depositing moisture or water substantially uniformly throughout the entire volume of the block from the top to the bottom thereof. One type of apparatus suitable for carrying out this invention is disclosed in the copending application of Boyd R. Abbott, Serial No. 709,313, filed November 12, 1946, and entitled "Apparatus for making corkboard insulation and the like."

It has been found that in order to secure the desired results, it is necessary to inject water which has been preheated to a temperature above about 170° F. When the water temperature falls materially below that degree, there is a thermal shock encountered which appears to deleteriously affect the final product, because it results in shriveling of the individual cork granules, and, upon slabbing and finishing of the material, the shriveled granules fall out and a rough, irregular surface results. For example, water at ordinary hydrant temperatures, such as about 60° to 80° F., will make a block which is substantially wholly unusable, and temperatures up to about 150° likewise produce blocks which are not wholly satisfactory. I prefer, therefore, to maintain the water temperature above 150° and preferably above about 170°. Since the essential heat absorption is effected in the latent heat of conversion of the water to steam, there is no necessity for using water at a temperature below that of about 170° F. and risking the production of unsatisfactory boards. The latent heat of conversion of water to steam is 970 B. t. u.'s per pound, and this is very effective in reducing the temperature of the formed corkboard blocks. When saturated steam is used, this heat of conversion is not present and the heat extraction which is obtained is small and, consequently, long periods of steam passage are necessary. The use of saturated steam also requires that the operation be effected in a closed space, such as in the baking mold, and this is objectionable for the reasons stated above. By injecting water into the formed blocks which are at a temperature of about 550° F., it is possible to reduce the temperature to a point below the ignition point of the cork substantially instantaneously, and with a very small quantity of water. For example, a 37" x 19½" x 13" block of corkboard made in accordance with the process described above, when injected with water at 170° F. in accordance with the present invention, about six pounds of water being injected, attained a reduction in temperature from about 550° F. to about 230° F.

The ignition point of cork is believed to be in the neighborhood of about 350° F. so that when the temperature is reduced to 230° F., assurance is had that the block is well below the ignition temperature of the mass and any exothermic reaction which would result in an increase in temperature of the mass is stopped.

In the practice of this method, it is important to distribute the water as uniformly as possible throughout the whole volume of the block under treatment. With the Abbott apparatus disclosed in the copending application identified above, there are about 43 needles which are disposed about 2½" apart and project into the block through its 13" x 37" cross-section. The water injected by the Abbott apparatus is distributed uniformly throughout the volume of the block, but I wish it to be clearly understood that in the practice of my invention, it is not necessary to use the Abbott apparatus, for other types of apparatus may be employed which are effective for distributing water throughout the block.

Upon the injection of water into the block, the heat in the block converts a substantial portion of the water into steam and the steam moves outwardly from the interior of the block, enveloping the same. According to the preferred practice, the blocks are preferably immediately passed through a chamber effective for maintaining such steam about the block. This effectively blankets the whole block in an inert atmosphere and prevents any surface burning.

Subsequent to the water injection, the blocks are stored for about four hours to permit the remaining moisture within the block to be substantially uniformly distributed therethroughout. The blocks are then slabbed in the customary manner and are permitted to toughen and increase in strength prior to the finishing operations. The injection needles are preferably inserted into the block along a direction perpendicular to the length of the finished boards to be cut therefrom. For example, with a block 37" x 19½" x 13" to be cut into 36" x 12" x 2" boards, the needles will be inserted from the 37" face through the 19½" depth so that the needles perforate the block along lines normal to the 36" x 13" face of the finished pieces.

The slabbed blocks are generally allowed to stand in the open air for about eight to twenty-four hours prior to final finishing operations where the blocks are reduced to boards of a desired thickness and size. This period is necessary, for the mass of cork granules as initially baked is rather fragile, increasing in toughness and strength over a period of time. The more dense compositions require longer cooling than the lighter density pieces.

The exact physical or chemical reaction which takes place resulting in this toughening of the cork granules is not known, but it has been demonstrated that it is not a function of temperature, for slabbed blocks have been rapidly cooled by the passage of cool air directly through the block, but such blocks have been fragile and lacking in structural strength. On the other hand, blocks have been slabbed and then maintained at a relatively high temperature for a period of eight to twenty-four hours, and these blocks have, at the end of such period of time, been found to be quite tough and strong.

Instead of injecting water into full sized blocks, it is possible, of course, to split the blocks into two or more slabs upon completion of the molding cycle and then inject water into the cut slabs. Where the formed blocks are large in size and the density is relatively high or not substantially uniform, such practice may be preferred for it permits more rapid migration of the water and steam throughout the area of the block and avoids all possibility of disruption of the mass due to the sudden expansion of the water into steam within the block.

Figure 2:
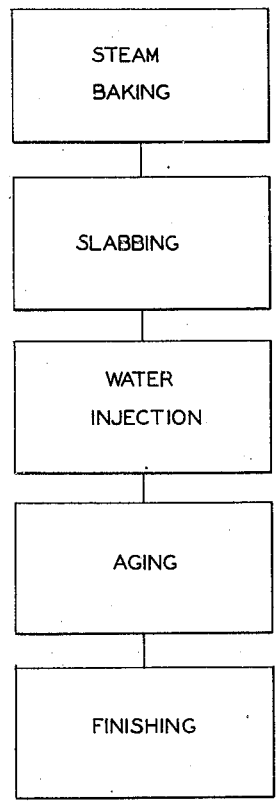

In the accompanying drawing, Figure 1 is a diagrammatic view partially in section illustrating apparatus useful in the practice of this invention, and Figure 2 is a flow sheet illustrating the preferred order of steps of practicing the invention.

In Figure 1, the block or slab of corkboard to be treated is indicated at 2, such block being supported upon a table 3. A plurality of needles 4 which have openings in their ends not shown are mounted upon a chamber support 5 and are brought down into the cork block 2 and water is injected into the block from a source 6. A hold-down plate 7 is provided which serves to secure the block 2 against elevation when the injection apparatus is elevated to withdraw the needles 4 from the block.

The foregoing apparatus is completely illustrated and described in the copending application of Boyd R. Abbott referred to above.

One of the most important advantages of the present invention is the fact that by use of it, it is possible to produce blocks of substantially lower density than heretofore possible without extensive scrap loss due to fires. With the ordinary steam-bake process, the boards generally have a density in the order of 0.61 pound per board foot. It is possible with the present invention to produce boards having a density of 0.56 with the same quality of cork. It is possible with higher quality cork to get even lower densities, for the matter of density permissible has heretofore been determined by the frequency of fires within the blocks. When low density blocks have been made heretofore, many fires have resulted, and this has forced the corkboard manufacturers to adopt higher density standards. It is, of course, desirable in many instances, to have low density blocks for the insulating efficiency of such block is improved, the cost is less, and, of course, the steam-baking cycle can be materially shortened if the density is substantially reduced. It has also been found that by the present water injection process, the shrinkage of cork blocks subsequent to molding has been substantially completely eliminated. In ordinary steam-bake corkboard manufacture, it is not uncommon for the blocks to shrink as much as three per cent in volume. This is important in the sizing operation for it eliminates many defective boards which sometimes result due to so-called "lacy ends" where excessive shrinkage has occurred, necessitating trimming close to the molded surfaces.

Another important advantage of the invention is that it permits the blocks to be slabbed into relatively thicker pieces than heretofore possible. With the advent of extremely low temperature equipment, maintained in the neighborhood of 30° to 60° below zero, there is a real demand for thick insulation materials. Heretofore, it has been necessary to slab the blocks to a maximum of 5" immediately upon removal from the molds in order to avoid too frequent fires, necessitating expensive laminating operations to build up the insulation to the thickness desired; whereas, with the present invention, the slabs may be six or even more inches in thickness with the same or lower density of material.

While I have illustrated and described a preferred embodiment of my invention, it will be understood that the same is not limited thereto but may be otherwise embodied and practiced within the scope of the following claims:

I claim:

1. In a method of making baked cork articles, the steps comprising heating cork granules in a mold to bind the granules into a self-sustaining mass, removing the formed mass from the mold, and, while the mass is still at an elevated temperature above the ignition temperature of the cork, injecting water thereinto to extract heat from the baked product and prevent ignition thereof.

2. In a method of making baked cork articles, the steps comprising heating a mass of cork granules in a mold by passing superheated steam therethrough to bake the cork granules into a shaped product, extracting the baked product from the mold at substantially baking temperature and above the ignition temperature of the cork, and injecting water into the baked product to extract heat therefrom.

3. In a method of making baked cork articles, the steps comprising heating cork granules in a mold to bind the granules into a self-sustaining mass, removing the formed mass from the mold, and, while the mass is still at an elevated temperature above the ignition temperature of the cork, injecting water heated to a temperature above about 150° F. into the mass to extract heat therefrom and prevent ignition thereof.

4. In a method of making baked cork articles, the steps comprising passing steam at a temperature between about 450° and 600° F. through a mass of cork granules disposed in a mold for a sufficient time to bake the same into a block, removing the same from the mold, and thereafter, prior to any substantial change in the temperature of the block, injecting water throughout substantially the entire extent of the block to reduce the temperature thereof below the ignition point of the cork.

5. In a method of making baked cork articles, the steps comprising heating cork granules in a mold to bind the granules into a self-sustaining mass, removing the formed mass from the mold, and, while the mass is still at an elevated temperature above 450° F., injecting water heated to above about 170° F. into the mass to extract heat therefrom and prevent ignition thereof.

6. In a method of making baked cork articles, the steps comprising passing superheated steam at a temperature of about 550° F. to 600° F. through a mass of cork particles disposed in a mold to bake the cork granules into a shaped product, extracting the baked product from the mold at substantially baking temperature, and immediately thereafter injecting water heated to a temperature above about 170° F. into the baked product to extract heat therefrom.

7. In a method of making cork articles, the steps comprising steam baking a mass of cork granules in a mold to form a block therefrom, returning the block from the mold, cutting the block into a plurality of slabs while maintained at substantially molding temperature and above the ignition temperature of the cork, and injecting water throughout substantially the entire extent of each of the slabs to reduce the temperature thereof below the ignition point of the cork.

8. In a method of making cork articles, the steps comprising steam baking a mass of cork granules in a mold to form a block therefrom, removing the block from the mold, cutting the block into a plurality of slabs while maintained at substantially molding temperature and above the ignition temperature of the cork, injecting water throughout substantially the entire extent of each of the slabs to reduce the temperature thereof below the ignition point of the cork, permitting the slabs to age in open air, and finally finishing the surfaces thereof.

9. In a method of making baked cork articles, the steps comprising passing superheated steam through a mass of cork granules confined in a mold to bake the granules into a self-sustaining block, extracting the formed block from the mold at substantially molding temperature and above the ignition temperature of the cork, and thereafter prior to any substantial change in the temperature of the block injecting water throughout substantially the entire extent of the block, said water at the time of injection having a temperature above about 150° F.

10. In a method of making baked cork articles, the steps comprising passing superheated steam through a mass of cork granules disposed in a mold to bake the same into a self-sustaining block, extracting the block from the mold at substantially baking temperature, and thereafter injecting water heated to a temperature above about 150° F. into the block while the block is at a temperature above the ignition point of the cork, to reduce the temperature thereof to a point below the ignition temperature of the cork.

11. In a method of making baked cork articles, the steps comprising piercing a baked cork article at a plurality of points throughout its volume, subsequent to removal of the baked article from the mold in which it is formed and while the article is at a temperature above its ignition point, and injecting water into the openings thus formed in the article to reduce the temperature thereof below the ignition point.

12. In a method of making baked cork articles, the steps comprising molding said cork granules under pressure with superheated steam in a mold to bake the cork granules into a shaped article, removing the article from the mold, piercing said article along a plurality of lines extending substantially throughout the depth of said article, injecting water into the pierced openings so formed to reduce the temperature of the formed mass from a temperature above the ignition temperature of the cork to a temperature below the ignition temperature of the cork, and thereafter cutting the article along a plane substantially perpendicular to the lines of piercing.

13. In a method of making baked cork articles, the steps comprising baking a mass of cork granules with superheated steam to form a porous block, said baking being effected in a mold at a temperature above 450° F. to form a shaped article, removing the article from the mold forming a plurality of openings in the block after baking and while the block is at a temperature above 350° F., and injecting water heated to a temperature above 150° F. into the openings for conversion into steam substantially uniformly throughout the entire volume of the porous block.

BOYD R. ABBOTT.

REFERENCES CITED

The following references are of record in the file of this patent:

UNITED STATES PATENTS

| Number | Name | Date |
| --- | --- | --- |
| 997,056 | Grunzweig | July 4, 1911 |
| 2,258,173 | Bratek et al. | Oct. 7, 1941 |

FOREIGN PATENTS

| Number | Country | Date |
| --- | --- | --- |
| 26,074 | Great Britain | 1907 |

Certificate of Correction

Patent No. 2,490,766 December 13, 1949

BOYD R. ABBOTT

It is hereby certified that error appears in the printed specification of the above numbered patent requiring correction as follows:

Column 6, line 12, for the word "returning" read *removing*;

and that the said Letters Patent should be read with this correction therein that the same may conform to the record of the case in the Patent Office.

Signed and sealed this 4th day of April, A. D. 1950.

[SEAL]

THOMAS F. MURPHY,
*Assistant Commissioner of Patents.*